United States Patent [19]
Meschke et al.

[11] Patent Number: 4,638,029
[45] Date of Patent: Jan. 20, 1987

[54] CERAMIC COMPOSITION AND PROCESS FOR USE THEREOF

[75] Inventors: Debra J. Meschke, Valley Cottage, N.Y.; Kenneth L. Hoy, St. Albans; Louis F. Theiling, Jr., Charleston, both of W. Va.

[73] Assignee: Union Carbide Corporation, Danbury, Conn.

[21] Appl. No.: 747,181

[22] Filed: Jun. 21, 1985

Related U.S. Application Data

[63] Continuation-in-part of Ser. No. 641,640, Aug. 17, 1984, which is a continuation-in-part of Ser. No. 468,670, Feb. 22, 1983, abandoned.

[51] Int. Cl.$^4$ ............................................. C08K 3/34
[52] U.S. Cl. .................................. 524/430; 524/445; 524/446; 264/12
[58] Field of Search ..................... 524/430, 445, 446

[56] References Cited

U.S. PATENT DOCUMENTS 3,915,917 10/1975 Weiant ............................. 524/430
4,174,331 11/1979 Myles ............................... 524/430

Primary Examiner—Paul R. Michl
Attorney, Agent, or Firm—Steven T. Trinker

[57] ABSTRACT

Ceramic compositions comprising a ceramic material such as alumina, clay, a dispersant and a polymeric binder are prepared using as the polymeric binder a connected branch copolymer comprising a core segment, non-crosslinked branched polymer segments attached to the core segment and linear polymer segments connected to the branched polymer segments and bearing terminal groups capable of effecting hydrogen bonding. By using this form of polymeric binder, polymers of relatively high molecular weight can be used, thereby giving good green strength in the greenware, while still keeping the slurry viscosity relatively low.

39 Claims, No Drawings

CERAMIC COMPOSITION AND PROCESS FOR USE THEREOF

This application is a continuation-in-part of our co-pending application Ser. No. 641,640, filed Aug. 17, 1984, which in turn is a continuation-in-part of our application Ser. No. 468,670, filed Feb. 22, 1983, and now abandoned.

BACKGROUND OF THE INVENTION

This invention relates to a ceramic composition and a process for use thereof. More specifically, this invention relates to a ceramic composition which uses a connected branch copolymer as a binder; this ceramic composition allows production of a slurry of relatively low viscosity, while giving good green strength in the bonded ceramic material prior to firing.

It is known to form a ceramic article by making up an aqueous slurry comprising water, a ceramic material such as aluminum, clay, as dispersed in our new binders. The slurry can then be spray dried so that it emerges in the form of substantially spherical granules, or otherwise formed into a desired shape. The resultant spray dried powder can then be dry extruded or molded to give a desired shape. Alternatively, the slurry can be poured into a mold and allowed to settle, thereby producing a coherent mass of ceramic material together with an upper layer of separated water, which is then removed by decantation. The coherent article produced is known as greenware. Such greenware is normally subjected to further forming operations, such as drilling to produce the final desired shape of the article, before the greenware is oven-fired at a very high temperature to produce the final ceramic article.

Such a manufacturing process imposes stringent demands upon the binder used. The slurry formed in the first step of the process is required to have a high solids content but a relatively low viscosity in order to assist the spray-drying process. The spray-dried powder is desirably self-lubricating, so that no additional lubricant is need during extrusion or molding. The binder is desirably such that no mold release compounds are needed during molding. It is also desirable that the binder introduce "spring-back" into the greenware so that the greenware can readily be extracted from molds or tooling or complicated forms. The greenware produced should have a high green density, a high green strength, and not be unduly brittle, since brittle greenware is difficult to machine and tends to chip. Finally, the binder chosen should be one which gives rapid burn-off during the final oven firing, and is non-reactive with the wide range of ceramic materials used comercially.

No existing ceramic binder adequately meets all these exacting requirements. One known binder is polyvinyl alcohol. Polyvinyl alcohol gives greenware with a high green strength and is useable with most important ceramic materials. However, polyvinyl alcohol does not produce self-lubricating properties in the spray-dried powder so that, in order to maintain maximum green density, an additional lubricant is needed. In addition, polyvinyl alcohol-bound ceramic compositions give very little spring-back when pressed, which leads to difficulties in trying to extract parts from certain types of tooling. When dry and isostatic tooling are used, polyvinyl alcohol-bound ceramic compositions have a tendency to stick to the mold, so that a mold release compound is needed during pressing. Finally, greenware produced using a polyvinyl alcohol binder is hard and brittle and consequently difficult to machine since it tends to chip. Polyvinyl alcohol also has the minor disadvantage that it must be dissolved in water before use.

Another type of binder used commercially in the manufacture of ceramic articles is polyalkylene glycol polymers. Most prior art binders of this type are essentially linear polyalkylene glycol polymers, usually made by polymerization of ethylene and/or propylene oxide; the commercially preferred linear polyalkylene glycol polymer binder is Polyethylene Glycol Compound 20M manufactured by Union Carbide Corporation, the assignee of this application. Polyalkylene glycol binders, such as Polyethylene Glycol Compound 20M, have the advantages of giving self-lubricating properties to the spray-dried powder, thereby eliminating the need for an additional lubricant, and giving greenware with high green density and medium green strength. No mold release compounds are needed during molding and the binder produces adequate spring back. In addition, greenware formed using this type of binder is not brittle so that the greenware can be machined without chipping, although the only moderate green strength of the greenware can present certain problems. Finally, polyalkylene glycol binders burn off rapidly and cleanly during oven firing.

The green strength of greenware produced using polyalkylene glycol binders can be improved by adding polyvinyl alcohol as a co-binder, typically in an amount of 10–20% by weight of the polyalkylene glycol polymer. The addition of polyvinyl alcohol as a co-binder does increase the green strength of the products, but has the disadvantage of making the greenware somewhat more brittle.

The main disadvantages of the prior art polyalkylene glycol polymers are their effect upon the viscosity of the slurry. In order to produce good binding properties in the greenware, it is necessary to use polyalkylene glycol binders having a relatively high molecular weight; Polyethylene Glycol Compound 20M has a molecular weight of about 20,000. Unfortunately, as the molecular weight of the polyalkylene glycol polymers rises, so does the viscosity of the slurry solution. In practice, a compromise has to be made between the need to use a high molecular weight polymer in order to improve greenware properties, and the need to keep molecular weight low in order to avoid undue elevation of the viscosity of the slurry. Moreover, in many cases, this compromise requires lowering the solids content of the slurry in order to keep its viscosity within acceptable limits. Such lowering of the solids content of the slurry is undesirable in that it makes the slurry more difficult to dry during the spray-drying step.

It might be thought the viscosity problems encountered with linear polyalkylene glycol polymer binders could be overcome by using a star polyalkylene glycol polymer binder. Star polymers comprise a number of molecular chains radiating from a central "hub". Such polymers may be produced either by initiating polymerization of a monomer with a molecule having a functionality of at least three; the residue of this polyfunctional molecule forms the hub of the star polymer. Alternatively, linear polyalkylene glycol polymers having the molecular weight desired for the arms of the star polymer may be prepared, and then linked together using an appropriate polyfunctional molecule. At low molecular weights, the star polymers do indeed have viscosities lower than comparable linear polymers. However, as the length of the branches are increased to produce molecular weights within the range used in ceramic binders, chain entanglement occurs between branches, resulting in viscosities higher than those for corresponding linear polymers—see Kurmar, N. Ganesh, *J. Polymer Science, Macromolecular Reviews*, 15, 255 (1980). Accordingly, the use of star polymers does not solve the viscosity problems encountered when using linear polyalkylene glycol polymers as binders in ceramic compositions.

Accordingly, there is a need for a polymeric binder for ceramic compositions which does not produce excessively high viscosities in the slurry but adequately fulfills the other requirements for such binders discussed above, and this invention provides compositions and processes using such a binder.

SUMMARY OF THE INVENTION

This invention provides a ceramic composition comprising a ceramic material, clay, a dispersant and a polyalkylene glycol copolymer binder. In the ceramic composition of the invention, the binder is of a type hereinafter referred to as a "connected branch" copolymer. The binders used in the present invention comprise:

(A) a core segment having a valence of v, wherein v is an integer, and having correspondingly v terminal bonds each connected to one of a group of:

(B) v polyvalent, non-crosslinked branched polymer segments each having an average of t terminal bonds, wherein t is greater than about two, one of these terminal bonds being connected to the core segment, and each of the branched polymer segments being connected via its remaining (t−1) terminal bonds to:

(C) a set of linear polymer segments, with an average of t−1 linear polymer segments per set, to provide a group of about v(t−1) linear polymer segments wherein the linear polymer segments have substantially similar chain lengths and composition within the group, the connected branch copolymer having a group of terminal linear polymer segments bearing terminal groups capable of effecting hydrogen bonding.

This invention also provides a process for producing a bonded mass of ceramic material, this process comprising forming an aqueous slurry comprising water, a ceramic material, clay, a dispersant and a binder, the binder comprising a connected branch copolymer as defined in the preceding paragraph. The water content of the slurry is then reduced until the bonded mass of ceramic material is formed.

The invention extends to a bonded mass of ceramic material produced by the process of the invention, and to a fired ceramic article produced by firing such a bonded mass of ceramic material.

The connected branch copolymers to be used in the compositions and processes of this invention are those copolymers having a group of terminal linear polymer segments bearing terminal groups capable of effecting hydrogen bonding. By the term "terminal linear polymer segments" is meant the group of linear polymer segments most remote from the core segment of the connected branch copolymer, these terminal linear polymer segments each having one terminal connected to a branched polymer segment, while the other terminal of each linear polymer segment carries the group capable of effecting hydrogen bonding. As noted above, the connected branch copolymers may have a plurality of groups of branched polymer segments and a plurality of groups of linear polymer segments alternating with the groups of branched polymer segments as one moves outwardly from the core segment of the connected branch copolymer. In such connected branch copolymers having multiple groups of branched and linear polymer segments, the inner, non-terminal group(s) of linear polymer segments will of course have both their terminals connected to differing groups of branched polymer segments and will thus not have any free terminals. In such complex connected branch copolymers, it is only the outermost, terminal group of linear polymer segments which need bear terminal groups capable of effecting hydrogen bonding.

DETAILED DESCRIPTION OF THE INVENTION

The connected branch polyalkylene glycol polymers used as binders in the composition and process of the invention are part of a wider group of connected branch copolymers described in our aforementioned copending application Ser. No. 641,640, the entire disclosure of which is herein incorporated by reference.

Accordingly, in order that the nature of the connected branch copolymers used in the compositions and processes of the present invention, and the processes used for their preparation, may be concisely described, the nature and preparation of the wider group of connected branch copolymers described in our aforementioned application Ser. No. 641,640 will first be described. Thereafter, the special requirements imposed on the connected branch copolymers by their use as binders in the compositions and processes of the present invention, and the preferred types of connected branch copolymers for use in such compositions and processes, will be described.

The connected branch copolymers disclosed in the aforementioned copending application Ser. No. 641,640 are derived from three main classes of reactants. These reactants, when reacted together in the appropriate manner, form the three primary segments—core, branch, and linear—which make up the connected branch copolymer.

The core segment comprises a reactant which has at least one reactive functional group. The term core reactant encompasses any compound which by the presence of reactive groups acts as a nucleating agent on to which branching polymerization monomers can be bonded. The core reactant can therefore be monomeric or polymeric, organic or inorganic, monofunctional or polyfunctional, so long as at least one reactive functional group is provided in its structure. The term "reactive functional group" is defined as any moiety which can react with a complementary moiety in the branching polymerization monomer to form a chemical bond. Such reactions encompass well-established chemical procedures for free radical, substitution or condensation reactions. Representative examples of a few of such reactions include the following:

| Functional Moiety | Complementary Moiety | Group Formed (containing covalent bond) |
| --- | --- | --- |
| —OH | 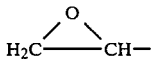 | 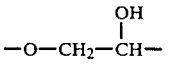 |

-continued

| Functional Moiety | Complementary Moiety | Group Formed (containing covalent bond) |
|---|---|---|
| | H₂C—(NH)—CH— | —O—CH₂—CH₂—NH₂ |
| | HOOC— | —O—C(=O)— |
| | O=C=N— | —O—C(=O)—N(H)— |
| —NH₂ | O=C=N— | —N(H)—C(=O)—N(H)— |
| | HOOC— | —N(H)—C(=O)— |

Derivatives of such moieties are also intended to be included. The reactive functional group on the core reactant may be selected from either group of functional or complementary moieties so long as the moiety on the branching polymerization monomer is complementary to that moiety.

Monomeric core reactants include hydroxy-compounds such as phenols and alkanols; amino-compounds such as mono-, di- or polyamines; carboxylic acids and their derivatives; siloxanes; and other compounds which contain at least one reactive functional group.

The core reactant may be of polymeric, linear, branched or star configuration. Linear core reactants which have reactive functional groups include polymers such as polyethers, polyesters, polysiloxanes, polyurethanes, polyamines, polyamides, polyolefins, to name but a few. Preferred linear core reactants include polyalkylene oxide glycols, higher aliphatic polyols and related hydroxy-terminated compounds. In a particularly preferred embodiment, the linear core reactant contains two reactive functional groups, i.e. the valence v is preferably 2.

Core reactants providing a star configuration are defined as compounds which contain molecular chains having multiple functional groups covalently bonded through a chain of atoms to a single, central atom or backbone. Examples of such star reactants which contain functional hydroxyl groups are glycerol (v=3), pentaerythritol (v=4), dipentaerythritol (v=6) and trimethylolpropane (v=3). Such star core reactants may be extended by polymerizing monomers onto each molecular chain, prior to connected branch copolymer formation.

One molecule of a monomeric or polymeric core reactant is provided as a single starter for each connected branch copolymer molecule.

The second portion of the connected branch copolymer is a branched segment produced by reacting non-crosslinking, branching polymerization monomers with the core reactant. The non-crosslinking, branching polymerization monomers are defined as monomers having functional groups which provide an additional functional group after the monomer has been polymerized at two reactive sites of the monomer. In other words, each branching polymerization monomer provides at least one additional reactive site for polymer chain growth. When the branching polymerization monomer is reacted with a core reactant, one of the reactive functional groups of the monomer reacts with the complementary reactive functional group in the core reactant to produce a branched core compound having a mono-, di- or polyvalent core segment terminated with non-crosslinking, branching polymer segments having at least two branch ends, i.e., sites, defined by the other two reactive sites. One of the remaining reactive sites of the branching polymerization monomer provides a reactive site for extending the branched segment by reaction with another branching polymerization monomer. The remaining reactive site provides a functional group which can be used to initiate a branch, as described below. As a result, branching polymerization monomers containing three reactive sites produce b+1 branches per b moles of branching polymerization monomers for each reactive functional group on the core reactant.

The connected branch copolymers are preferably essentially free of any crosslinking in order to achieve the maximum reduction in neat viscosity without the formation of gel particles when used in aqueous systems. Crosslinking, on the other hand, of the connected branch structure would tend to increase the viscosity leading ultimately to gel formation.

Preferred non-crosslinking, branching polymerization monomers are compounds which undergo substantially linear homopolymerization. Such compounds contain a functional group at a third reactive site which does not readily react during the branching polymerization. Examples of such kinds of compounds include imines, hydroxy-containing oxiranes, and other polyfunctional compounds which are not crosslinkable.

Particularly preferred non-crosslinking branching polymerization monomers include compounds having three-membered oxygen- or nitrogen-containing ring structures, i.e., oxiranes and imines, respectively. In the case of oxirane compounds, there is an additional functional group present to provide the third reactive site for the branching polymerization monomer. A preferred class of branching polymerization monomers are compounds having the structure:

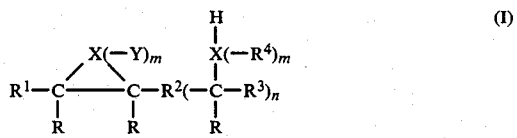

(I)

wherein X is nitrogen, oxygen, or sulfur; Y is a alkyl, alkylamine, or hydroxyalkyl; R can be hydrogen or lower alkyl; $R^1$ and $R^3$ are each hydrogen, alkyl, aryl or aralkyl; $R^2$ is (1) an alkyl, aryl or aralkyl group which may be connected to $R^1$ to form a cyclic ring, or (2) hydrogen when n is 0; $R^4$ is hydrogen or lower alkyl; m is (1) 0 when X is oxygen or sulfur, or (2) 1 when X is nitrogen; n is 0 or 1, provided that n is 1 when X is oxygen or sulfur. When X is oxygen or sulfur, two reactive sites during polymerization are provided by the X and Y moieties, with a third reactive site provided by a carbon atom in the three-membered ring. When X is nitrogen, providing an imine, two of the three reactive sites are provided by the nitrogen atom with the other reactive site provided by a carbon atom in the three membered ring.

Particularly preferred branching polymerization monomers with the structure of Formula I are glycidol and ethyleneimine, i.e. aziridine.

The branching polymerization monomer may be added to the core reactant in a molar ratio of about 2 to about 50 moles, and preferably about 2 to about 20 moles, of branching polymerization monomer to each equivalent of core reactant. Since b moles of branching polymerization monomer provides b+1 branches for each reactive core terminal group, the average number of branches per branching segment can be defined by the formula:

$$(b+1)/c \qquad (II)$$

wherein b is the number of moles of branching monomer added, and c is the number of reactive functional groups on the core reactant. Using this relationship, it is apparent that the branching structure of the branched polymer can be controlled by varying the amount of branching polymerization monomers utilized as well as by selecting core reactants with a different number of reactive terminal groups. Thus, for example, if a linear core segment (c=2) is employed, the average number of terminal bonds t of the branched polymer segments in the resulting connected branch copolymer will be from 1.5 to 25.5, and preferably from 1.5 to 10.5.

In another embodiment, a linear polymerization monomer may be copolymerized with the branching polymerization monomer during the branching polymerization step to provide a randomly branched copolymer structure as the branched segment. The addition of linear polymerization monomers does not change the number of branches in that the relationship of b+1 branches per b moles of branching polymerization monomer is maintained. Instead, the average distance between branches is extended depending upon the amount of linear polymerization monomer provided. This results in a reduced branching density within the branched segment. Any of the linear polymerization monomers set forth below, which can undergo polymerization with the branching polymerization monomer, can be utilized to provide copolymerization.

The core reactant and branching polymerization monomer may be selected so that the core segment comprises units identical to monomeric units present in the branched polymer segment. Such a complex branched core segment can be produced by providing a core segment identical to linear polymerization monomers copolymerized with branching polymerization monomers during the branching polymerization step. For example, a core reactant such as ethylene glycol will provide an ethylene diether core segment indistinguishable from oxyethylene monomeric units derived by reacting ethylene oxide as a linear polymerization monomer which may be added during the branching polymerization step. The valence v of such a complex core segment is limited only by the difficulty of synthesising complex core segments with large valences.

The third part of the connected branch copolymer structure is generated by reacting linear polymerization monomers on to the reactive sites in the branches of the branched core compound after the branching polymerization has been completed. The linear polymerization monomer is polymerized on to substantially each branch reactive site to produce sets of linear polymer segments for each branched polymer segment. In this manner, the linear polymer segments polymerized on to each branch reactive site provide branches with substantially similar chain lengths and compositions extending from each branch end. The chain length will depend upon the amount of linear polymerization monomer added, whereas the composition will depend upon the monomer or mixture of monomers provided during linear polymerization.

The term "substantially similar" is based on a statistical average for all connected branch copolymer molecules produced. With regard to composition, homopolymer linear segments will provide identical compositions within a group of such segments. For random or block copolymer linear segments, the composition will vary somewhat between individual segments but will provide an overall average of similar copolymeric substitution typical of random or block copolymers. With regard to chain-length, most of the linear copolymerization segments will fall within a relatively narrow range of monomeric units per segment.

The average chain length of the linear polymer segments may vary, depending upon the reaction kinetics of the linear polymerization monomer utilized. With respect to the preferred alkylene oxide monomers, epoxide rings exhibit greater reactivity toward primary, as opposed to secondary, hydroxyl groups. As a consequence, the average chain length for linear polymer segments extending from branch ends with primary hydroxyl groups will be greater than the average chain length for linear polymer segments extending from branch ends having secondary hydroxyl groups.

The proportion of primary to secondary hydroxyl groups is also important in determining reaction kinetics. The presence of predominantly secondary hydroxyl groups will result in a lower probability for chain length extension from the single, terminal, primary hydroxyl group in each branched polymer segment.

Chain length reaction kinetics are also dependent upon the type of linear polymerization monomer. For example, ethylene oxide differs from the other alkylene oxides in that polymerization results in the production of primary hydroxyl groups, whereas polymerization of all the other alkylene oxides results in the formation of secondary hydroxyl groups. There will be correspondingly greater variation in chain length for ethylene oxide homopolymers and copolymers when such linear polymerization extends from a branched polymer segment containing predominantly secondary hydroxyl groups.

In addition, greater steric availability of the hydroxyl groups near the end of the branched polymer segments remote from the core segment provides greater reactivity, resulting in the higher probability of chain length extension than at those branch ends having relatively high steric hindrance, due to their proximity to the center of the core compound.

Chain lengths within each group of linear polymer segments are therefore "substantially similar" when considering that these competing reaction kinetics will provide a statistical average of chain lengths over a large number of molecules. The extent of chain length formation will vary directly with the amount of linear polymerization monomer utilized.

The linear polymerization monomer may be any compound or mixture of compounds which undergoes linear polymerization initiated by reacting onto the functional groups at the branch ends of the branched core reactant. Such monomers include alkylene oxides; lactones; lactams; and thio derivatives of the foregoing compounds; alkylene carbonates; siloxanes; alkyleneimines; or monomers which undergo linear copolymerization, such as dicarboxylic acids with diols or diamines, to produce polyesters or polyamides respectively; diisocyanates and glycols producing polyurethanes; and so on, so long as the linear polymerization monomer contains a reactive group which can react with the branch end of the branched core compound. The linear polymer segment may be a block or random copolymer such as result from combinations of monomers capable of linear copolymerization.

Preferred linear polymerization monomers include alkylene oxides and co-monomer mixtures thereof, such as ethylene oxide, propylene oxide or mixtures thereof. The co-monomers may be added simultaneously to form a linear random copolymer segment, or sequentially to form a linear block copolymer segment.

The amount of linear polymerization monomers added may be from about 2 to about 600 moles, and preferably between 2 and about 350 moles, of linear polymerization monomer per branch end in the branched, core compound.

Both branching and linear polymerization reaction steps may be carried out in the presence of suitable adjuvants, solvents, stabilizers, catalyst and other polymerization aids well known to those skilled in the art.

Various catalysts may be utilized in varying amounts, depending upon the type of polymerization being conducted and in particular upon the factors discussed below. Suitable catalysts include caustic materials, such as alkali or alkaline earth metals or their corresponding hydroxides and alkoxides; Lewis acids; mineral acids, and so on. Selection of specific catalysts is considered to be within the skill of the art. Crown ethers can be used as rate assisting agents.

The amount of catalyst employed during the branching and linear polymerization reaction steps is important for obtaining the connected branch copolymers. The amount of catalyst employed in the branching polymerization reaction step should be a sufficient amount to effect substantially complete reaction of the core reactant with the non-crosslinking, branching polymerization monomer. Likewise, the amount of catalyst employed in the linear polymerization reaction step should be a sufficient amount to effect substantially complete reaction of the branched core compound with the linear polymerization monomer, and to provide an essentially uniform distribution of linear polymerization monomer along each branch of the branched core compound. While not wishing to be bound by any particular theory, there is evidence to believe that the amount of catalyst is dependent upon (1) the total functionality of the non-crosslinking, branching polymerization monomer, (2) the particular core reactant employed in preparing the connected branch copolymers, and (3) the solubility and dissociation properties of the catalyst itself.

The total functionality ratio of the non-crosslinking, branching polymerization monomer, e.g., glycidol, based on the moles of catalyst can be determined according to the following formula:

$$T = M_m([M_m/M_c] + F)/M_t$$

wherein T is the total functionality ratio of monomer to catalyst; $M_m$, $M_c$ and $M_t$ are the numbers of moles of monomer, core and catalyst respectively; and F is the functionality of the core. As a typical illustration, in a reaction system containing 0.08 moles of difunctional core reactant, 0.49 moles of non-crosslinking, branching polymerization monomer and 0.06 moles of catalyst, the ratio of moles of catalyst to total functionality of non-crosslinking, branching polymerization monomer is 1:66.

The ratio of moles of catalyst to total functionality of non-crosslinking, branching polymerization monomer will vary for reaction systems employing different catalysts and different core reactants. For instance, for reaction systems employing sodium hydroxide as the catalyst and polyethylene glycol as the core reactant, the ratio of moles of catalyst to total functionality of non-crosslinking, branching polymerization monomer is preferably at least about 1:75. For reaction systems employing potassium hydroxide as the catalyst and random propylene oxide/ethylene oxide copolymer as the core reaction, the ratio of moles of catalyst to total functionality of non-crosslinking, branching polymerization monomer is preferably at least 1:38. For reaction systems employing potassium hydroxide as the catalyst and methoxy polyethylene glycol as the core reactant, the ratio of moles of catalyst to total functionality of non-crosslinking, branching polymerization monomer is preferably at least about 1:450.

It is believed that the difference in the minimum ratio values for reaction systems employing different catalysts and core reactants can be attributed to the ability of the various core reactants to solvate the catalyst ion pair, e.g., $RO^-K^+$, wherein $RO^-$ is the anion derived from the core reactant and $K^+$ is the potassium cation derived from the catalyst. The active species is the highly dissociated, highly solvated ion pair. If the ion pair is bound more tightly and is less solvated, more moles of catalyst would be required to shift the equilibrium sufficiently so as to obtain at least a similar number of dissociated ion pairs. Thus, the amount of catalyst employed in the branching and linear polymerization reactions is dependent upon the solubility and dissociation properties of the particular catalyst in the core reactant. Reaction systems employing polyethylene glycol as the core reactant generally solvate the ion pair well forming highly dissociated species. Reaction systems employing random propylene oxide/ethylene oxide copolymer in the core reactant generally solvate the ion pair less readily and therefore require more catalyst. It is expected that as the propylene oxide content of the core reactant increases, a concomitant increase in amount of catalyst will be required for the particular reaction system.

At ratios less than the minimum values for the particular catalyst and core reactant employed in preparing the connected branch copolymers, it has been found that the desired branching and linear polymerization reactions do not occur properly; therefore, the connected branch copolymers cannot properly be prepared at ratios less than the above minimum values. For example, when glycidol is used as the non-crosslinking, branching polymerization monomer in a reaction system containing a ratio of moles of catalyst to total functionality of non-crosslinking, branching polymerization monomer of less than the above minimum ratio values, bases exist to believe that homopolymerization of glycidol occurs thereby providing for the formation of an essentially linear polymer having a generally broad molecular weight distribution.

The branching and linear polymerization reactions may be conducted within a temperature range from about 50° to about 300° C., preferably from about 90° to about 150° C., and most preferably from about 100° to about 120° C. The reactions may be conducted an inert atmosphere at atmospheric or super-atmospheric pressures, preferably from about 10 to about 200 psig, and most preferably from about 15 to about 65 psig.

The type or amount of catalyst, temperature, pressure and other polymerization parameters will vary depending upon the type of polymerization as discussed above, using those procedures, i.e., batch or continuous methods, well established in the prior art.

The polymerization reactions are generally conducted for a period of time sufficient to enable substantially all of the monomers to be consumed, i.e., for the polymerization to go to completion, i.e., exhaustion, so as to minimize monomer content in the connected branch copolymer product and to provide the desired connected branch copolymer. Depending upon the amount and type of monomers provided, the time will vary and may take 6 hours or more for each polymerization step. Overall reaction time to form a highly branched copolymer will usually be less than 64 hours, preferably less than 36 hours, and more preferably less than 8 hours, when the process involves a series of sequential polymerizations.

The branching polymerization monomers are preferably added slowly during the branching polymerization step in order to avoid the formation of monomer homopolymerization competing with polymerization onto the core reactant. The branching polymerization monomers are maintained at a temperature, prior to the addition thereof in the branching polymerization step, sufficient to avoid the formation of gel particles in the reaction mixture, e.g., oftentimes at a temperature below 30° C., preferably at a temperature of from about 0° C. to 10° C.

The two steps of branching and linear polymerizations may be repeated sequentially to the extent desirable and feasible in the particular reaction system used. Approximately 20 such repetitions is considered to be a practical maximum, although not limitative. Preferably the two steps are repeated from 1 to about 10 times. This repetition produces a connected branch copolymer consisting of alternating branched and linear polymer segments. The branching polymerization which occurs subsequent to a linear polymerization step entails reacting the branching polymerization monomer with the functional group at the end of the linear segments of the connected branch copolymer to provide a branch segment extending from each linear segment. The number of linear segments therefore increases with each subsequent branching step, such that the resulting branched copolymer may contain a large number of linear segments formed during the last polymerization step in a long series of polymerizations. As a result of the sequential polymerization steps, divalent linear segments are provided within the connected branch copolymer between branch segments. Monovalent linear segments are provided only by the last linear polymerization step. When the polymerization sequencing is ended with a branching polymerization step, the connected branch copolymer obviously contains only divalent linear segments. The connected branch copolymer will aways contain two or more sets of linear polymer segments having substantially similar chain lengths and compositions within each set based upon a single linear polymerization step. When multiple linear polymerizations are conducted, however, the group of linear polymer segments formed during one polymerization step can be varied substantially from that of other, separate polymerization steps.

Thus, for example, when at least two branching polymerization steps and at least two linear polymerization steps are employed in their preparation, the connected branch copolymers will have a first group of divalent linear polymer segments containing terminal bonds connected to a second set of about $v(t-1)$ branched polymer segments each having an average of about say $t^1$ terminal bonds, each of the branched polymer segments in the second set being connected to a second set of linear polymer segments, with an average of $(t^1-1)$ linear polymer segments per set, wherein $t^1$ is greater than about two, providing a second group of about $(t^1-1)[v(t-1)]$ linear polymer segments in the second set, the linear polymer segments having substantially similar chain lengths within the second group.

The branching and linear polymerization reactions are conducted with sufficient agitation or mixing of the reaction ingredients so as to enable essentially all of the ingredients to be reacted, and to substantially reduce the formation of gel particles in the reaction mixture. Sufficient agitation of the reactor ingredients is necessary to provide branches with substantially similar chain length and composition. The polymerization reactions are conducted so as to maintain kinetic control and prevent diffusion control.

The connected branch copolymer may be recovered using procedures well established in the art, and may include subsequent processing steps, such as ion exchange, and/or neutralization using, for example, magnesium silicate, phosphoric acid, acetic acid or other well known neutralizing agents, in order to obtain the desired product in a stable form.

In a typical embodiment, a catalyzed core reactant is charged to a reactor at about 110° C. under 20 psig of nitrogen. The branching polymerization monomer or mixture of monomers maintained at a temperature below 10° C. is then added slowly to the reactor vessel with continuous agitation. The reaction is continued until substantially all the branching polymerization monomers have been consumed. The resulting product can then be isolated before undergoing additional polymerization or, if the linear polymerization can be conducted using the same catalyst, the linear polymerization monomer or monomer mixture can be added to the reactor vessel with continuous agitation, and the reaction allowed to go to completion.

If so desired, the branching and linear polymerizations are then repeated under similar conditions using the same constituents, or under different polymerization conditions, as required, if the branching or linear polymerization monomers are changed and require different reaction conditions. Once the polymerization reactions have been completed, the connected branch copolymer product is removed from the reactor vessel, and may be neutralized and recovered.

Using such a procedure, a connected branch copolymer is produced with a core segment, and relatively ordered portions of alternating branched and linear polymer segments. The term "connected branch copolymers" is derived from the structure of the copolymers of the present invention containing branched polymer segments which are connected through a di- or polyvalent core segment and/or through divalent linear segments. As such the copolymers used in the compositions and processes of the present invention always have a connected branch structure. In one sense, each branched polymer segments having pendant linear polymer segments has a comb polymer structure wherein the branched segment represents the back of the comb with the linear segments form the teeth. Viewed in this way, the copolymers used in the present invention can be regarded as connected comb polymers wherein the core segment and each divalent linear segment may end in comb substructures. The structures of the connected branch copolymers provide a unique molecular architecture quite different from the structures disclosed in the prior art. Examples of differing types of connected branch copolymers are shown and described in FIGS. 1–6 and the accompanying description of our aforementioned copending application Ser. No. 641,640. Preferred connected branch copolymers for use in this invention contain divalent linear polymer segments extending between separate branched polymer segments. Monovalent linear polymer segments provide the terminal portions of the polymer remote from the core segment. The end of the monovalent linear polymer segments may be provided with a reactive group, such as amino, carboxyl, siloxyl, phosphate, hydroxyl. Esters, salts and amides of acidic groups can also be used. Preferably, the terminal functional group is a hydroxyl group.

The core segment of the connected branch copolymer preferably has a linear or star structure. A linear core segment could be monovalent but preferably would be divalent with branching polymer segments at both terminal bonds. Representative examples of linear core segments include polysiloxanes, polyoxyalkylenes, polyalkylenes, polyethers, polyamides, polyurethanes and alkyl ethers. Star core segments are preferably polyethers derived from polyols such as glycerol, pentaerythritol, dipentaerythritol, trimethylol propane, trimethylol ethane; or disaccharides such as sucrose, glucose, mannitol or sorbitol.

Preferred branching polymer segments include polyamines and polyethers. A preferred branching polymer segment is a glycidyl polyether. Glycidyl polyethers derived from methyl glycidyl ether may also be employed.

Representative examples of linear polymer segments include polyethers, polyamines or polysiloxanes. Preferred linear polymer segments include oxyethylene, oxypropylene, or random or block copolymers thereof.

The connected branch copolymers used in the invention have a core segment with a valence, v of greater than or equal to one and preferably two. The average valence of each branched polymer segment per set—t, t', t'' and so on, depending on the number of sets—is at least about 3, preferably between about 3 and about 50, and most preferably between about 3 and about 20.

Defined in terms of structural formula, the connected branch copolymers may be represented as:

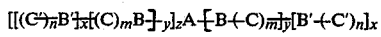 (III)

wherein A is a core segment having a valence of z+1; B and B' are non-crosslinked, branched polymer segments having valences of m+1 and n+1 respectively; C and C' are linear polymer segments having substantially similar chain lengths and composition within each group of x or y segments; m is greater than 1 and may vary between each set of y linear polymer segments; n is (1) greater then 1 or (2) may be 0 when y is greater than 0; x is (1) 1 when y is 0 or (2) m when y is 1 and the product of all m values when y is greater than 1; y and z are each integers greater than or equal to 0; provided that y is at least 1 when z is 0.

Formula III utilizes particular parenthetical notations. Covalent bonds between different segments which extend through parentheses or brackets designate serial repetitions, such that the polymer segments enclosed in the brackets having the y subscript represent a series of branched and linear segments repeating y times. Covalent bonds falling within the parenthetical notations, such as the bonds between the branched and linear polymer segments and within the braces, designate parallel repetitions. As such, the values for m, n and z define the number of bonds extending out from B, B' and A, respectively. In other words, m and n determine the valences of the branched polymer segments and z determines the valence of the core segment.

When viewed using the parameters in Formula III, the connected branch copolymers can be seen as containing a highly ordered arrangement of polymeric segments covering a wide variety of individual structures. The value y in Formula III equals the number of sequences in which the branching and polymerization steps have been repeated. The valence of the core segment, v equals z+1. The valence of the branched polymer segments equals the corresponding m (or n) values+1.

A particularly preferred connected branch copolymer structure is:

 (IV)

wherein A, B', and C' and n are as previously defined; y is 0; and z is 1. An example of a connected branch copolymer satisfying Formula IV is one which contains a divalent linear core segment.

The physical properties of the connected branch copolymers may be controlled by varying the types of reactants and monomers used to make up the various core, branch and linear segments of the polymer. A beneficial characteristic which may be provided by these branched polymers, useful in such applications as interfacial agents, can be established by providing relatively distinct hydrophobic and hydrophilic portions of the polymer. For example, the core segment can be made up of a relatively high molecular weight hydrophobic polymer, whereas the sets of linear polymer segments may be comprised of hydrophilic polymers, or vice versa. Due to the presence of a series of linear polymer segments, the linear segments portion of the polymer may provide an effective solvating means for a compound or a particle having a similar hydrophilicity to the linear segments within an otherwise hydrophobic environment similar to the hydrophobicity of the core segment.

Another characteristic of the connected branch copolymers relates to their capacity to provide a large number of functional groups at the ends of the monovalent linear polymer segments remote from the core compound. Due to the relative symmetry of the connected branch copolymer having linear polymer segments of subtantially similar chain lengths and compositions within each set, a relatively large concentration of functional groups may be provided in a small area such that the polymer may act as a carrier for compounds which have the capacity to be associated with these functional groups. If the functional groups are hydroxyl groups or other groups capable of effecting hydrogen bonding, the association may be in the form of hydrogen bonding. If the functional groups are ionic species, the association may be in the form of ionic bonds.

As a result of the wide variety of characteristics which the connected branch copolymers may be prepared to have, these polymers may be useful in many applications. For example, in uses where viscosity control is of interest, viscosity is found to be one property of the connected branch copolymers which demonstrates an unexpected and advantageous distinction over similar polymers set forth in the prior art. Polyalkylene oxide connected branch copolymers have been shown to have lowered viscosities when compared to linear or star polyalkylene oxide polymers of similar molecular weight. Randomly branched polymers show a similar propensity for lowered viscosities like the connected branch copolymers, but significant differences exist between these two types of structures. In this regard, the connected branch copolymers may be designed to provide for a wide range of viscosities beyond the limits of the random branching structures, as well as lower viscosities than that which can be achieved through random branching. In addition, other properties can be varied, such as water solubility, to provide for completely water-miscible polymers as distinguished from the partially water-soluble, randomly branched prior art structures with similar molecular weight and composition.

Control of viscosity for high molecular weight polymers can be achieved through modification of chain length within a given composition. Linear polymers show an increase in viscosity with increasing molecular weight. Correspondingly, star polymers with the same polymer composition show a similar increase in viscosity with increase in molecular weight, but have correspondingly lower viscosities than the linear polymer structures. Connected branch copolymers show an even greater reduction in viscosity at the same molecular weight than the viscosity values of corresponding linear and star polymers.

Although not wishing to be bound to any particular theory, this phenonmenon may be due to the shorter chain lengths of the connected branched copolymers when compared with the single chain length of the linear polymer, or the relatively few chain lengths of the star polymer, having similar molecular weights. A discussion of polymer viscosity may be found in an article entitled "Viscosity-Molecular Weight-Temperature-Shear Rate Relationships of Polymer Melts: A Literature Review," by N. G. Kumar, in the *Journal of Polymer Science: Macromolecular Reviews,* Volume 15, at pages 255–325 (1980). According to one theory, viscosity increases gradually with increasing chain length up to a critical point where chain length is sufficient to create chain entanglement, thereafter causing a significant increase in viscosity for increasing molecular weight. By providing highly branched structures, the critical point for chain entanglement can be extended significantly to much higher molecular weights, causing a significant reduction in viscosity for highly branched polymers when compared with linear or star polymers. Conversely, the connected branch copolymers can be provided with fewer and longer chain lengths, thereby approaching the structures and viscosities of the star polymers.

Randomly branched polymers can achieve a similar effect to some degree by varying the concentration of branching polymerization monomer in the bulk polymerization with the linear polymerization monomer. Randomly branched polymers, however, do not provide the flexibility in varying viscosity over a wide range, presumably since the orientation of linear segments within randomly branched polymers cannot be as readily varied as the chain length and orientation of linear segments in connected branch copolymers. Instead, randomly branched polymers inherently contain a wide variety of chain lengths of both branching and linear segments. Furthermore, randomly branched polymers show a dependence between viscosity and the amount of branching polymerization monomer provided, in that at higher molecular weights greater concentrations of branching polymerization monomer provide relative reductions in viscosity.

In contrast, the connected branch copolymers have no viscosity dependence upon the concentration of branching polymerization monomers within the polymer, and are therefore qualitatively distinct from randomly branched polymers with regard to viscosity control. There is, however, a viscosity relationship established for connected branch copolymers with respect to the amount of branching provided, such that greater branching will generally result in lowered viscosities. In addition, the critical point of chain entanglement in connected branch copolymers may be extended significantly beyond the critical points of the other polymer structures to provide lower viscosities at higher molecular weights than has heretofore been achieved.

The connected branch copolymers used in the present invention also possess an unexpected and potentially useful property shown by an increase in viscosity for a reduction in molecular weight when the chain length of the monovalent linear polymer segment is reduced towards zero. This increase in viscosity may be the result of the interaction between the functional groups among the copolymer molecules or with the suspending medium. For example, when the functional groups are hydroxyl they may interact with the water molecules in an aqueous system resulting in a viscosity increase as the molecular weight is reduced. This is in sharp contrast to the general rule that decreases in molecular weight will always result in lowering viscosity for these kinds of polymers. This effect also demonstrates the potential for the connected branch copolymer structures at lower molecular weight ranges to exhibit additional properties and utility due to the presence of such a large concentration of functional groups.

Now that the connected branch copolymers, and the methods for their preparation, described in our aforementioned copending application Ser. No. 641,640, have been described, the special requirements imposed on the connected branch copolymers by their use in the compositions and processes of the present invention, and the preferred types of connected branch copolymers for use in such compositions and processes, will be described.

Although the connected branch copolymers having multiple groups of branched and linear polymer segments can be used in the compositions and processes of this invention, in general we do not favor the use of this type of connected branch copolymer in such compositions and processes. Instead, the preferred type of connected branch copolymer for use in the present invention is one which has only a single group of branched polymer segments and a single group of linear polymer segments. It is thus preferred that the group of linear polymer segments connect the core segment directly to the terminal linear polymer segments bearing terminal groups capable of effecting hydrogen bonding. Such connected branch copolymers having only a single group of branched polymer segments and a single group of linear polymer segments tend to be more flexible than the more complex connected branch copolymers having multiple groups of branched polymer segments and linear polymer segments, and this increased flexibility is believed to give better binding characteristics in that the copolymer binder molecule is free to deform in order to maximize the interactions between the terminal linear polymer segments and the particles of ceramic material. It is believed (although the invention is in no way limited by this belief) that it is these interactions between the terminal linear polymer segments and the particles of ceramic material which are responsible for the binding action of the connected branch copolymers.

As noted above, the connected branch copolymers provide a large number of functional groups at the ends of the terminal linear polymer segments. Since it is believed that it is the interactions between the terminal groups on the terminal linear polymer segments and the particles of ceramic material which are responsible for the binding ability of the connected branch copolymers, binders used in the compositions and processes of the invention are those connected branch copolymers in which the terminal linear polymer segments bear terminal groups capable of effecting hydrogen bonding. Appropriate groups capable of effecting hydrogen bonding include, for example carboxylic acid groups, esters, salts of amides of carboxylic acid groups, amino groups, phosphate groups and their esters, salts and amides and hydroxyl groups. Hydroxyl terminal groups are preferred because of their strong hydrogen bonding and water solubilizing properties. Furthermore, it is preferred that the terminal linear polymer segments of the binder be hydroxyl-terminated polyoxyalkylene linear polymer segments since such polyoxyalkylene linear polymer segments provide good hydrogen-bonding properties and can readily be prepared from inexpensive monomers.

It is desirable that the copolymer binder have a relatively large number of terminal linear polymer segments in order to provide a large number of terminal hydroxyl groups. Preferably the connected branch copolymer comprises from about 8 to about 26 of the hydroxyl-terminated polyoxyalkylene linear polymer segments, and in most cases optimum binding capacity will probably be achieved using from about 13 of the hydroxyl-terminated polyoxyalkylene linear polymer segments.

Also, as already noted above, solutions of the connected branch copolymers used in the compositions and processes of the invention typically have lower viscosities than linear or star polymers of similar chemical composition and molecular weight. This lower viscosity is important in the compositions and the processes of this invention since binding capacity is strongly dependent upon molecular weight; in general, the higher the molecular weight of the polymer the higher the binding capacity. As already noted, in prior art ceramic compositions the ability to use high molecular weight polymers having improved binding capacities has been greatly restricted by the relatively high viscosities of prior art polymeric binders possessing such high molecular weights. The reduced viscosity of aqueous solutions of high molecular weight connected branch copolymers used in the compositions and processes of the invention enables polymers having higher molecular weights to be used without undue increase in the viscosity of the compositions. It is preferred that the connected branch copolymers used in the compositions and processes of the invention have a molecular weight of at least 20,000. The upper limit on the molecular weight of the connected branch copolymer is naturally set by considerations of solubility and viscosity of the ceramic composition but in practice there is no difficulty using connected branch copolymers with molecular weights of at least 50,000 or even up to about 80,000 may be useful.

As already noted, the viscosity of solutions of the connected branch copolymers varies not only with the total molecular weight of the connected branch copolymer and with the number of linear polymer segments therein, but also with the length of the core segment. As noted above, although in general for a given molecular weight the viscosity of solutions of the connected branch copolymers tends to increase with length of the core segment, at very low core segment molecular weight the viscosity increases sharply as the core length tends to zero. Obviously, it is desirable to avoid this region of very rapid increase in molecular weight as the length of the core segment tends towards zero, and accordingly in general it is preferred that the molecular weight of the core segment not be below about 200 or above about 10,000.

Some caution should be exercised in choosing binders for use in the compositions and processes of this invention on the basis of viscosity tests of simple aqueous solutions of these binders. As shown in more detail in the examples below, there is no simple relationship between the viscosity of a simple aqueous solution of a binder and the viscosity of a ceramic composition containing such a binder. Accordingly, selection of an appropriate binder for use in the compositions and processes of the invention is best made with the aid of viscosity tests on ceramic composition slurries containing the binder.

The reduction in viscosity at a given molecular weight provided by using a connected branch copolymer instead of prior art linear or star polymers is so great that it is possible, by careful design of the connected branch copolymer, to produce a polymer having three times the molecular weight of prior art linear or star polymers but having the same viscosity in the ceramic composition.

As already mentioned above, a further important consideration in polymeric binders to be used in ceramic compositions is solubility, since it is the solubility of the polymeric binder which normally imposes a lower limit on the amount of water which must be included in the ceramic composition, and, especially where the ceramic composition is to be spray-dried, it is desirable that the ceramic composition have as high a solids content (i.e. as low a water content) as possible. Prior art polyoxyalkylene polymers useable in ceramic formulations, such as the aforementioned Polyethylene Glycol Compound 20M, usually do not have solubilities in excess of about 50 parts by weight per 100 parts by weight of water. It is desirable that the connected branch copolymers used in these compositions and processes of this invention have at least this degree of solubility, in order that the water content of the composition (in the slurry form) not be in excess of about 2 parts by weight of water per 1 part by weight of connected branch copolymer. However, by careful design of the connected branch copolymer, the solubility thereof can be increased to approximately 100 parts per 100 parts by weight of water, thereby markedly reducing the minimum amount of water needed in the ceramic compositions of the invention and increasing the solids content of such compositions. Preferably, in the ceramic compositions of the invention having the form of slurries, the total solids content is from about 60 to about 85 percent by weight.

The solubility of the connected branch copolymers used in the compositions and processes of the invention is, of course, greatly affected by the chemical nature of the core segment, branched polymer segments and linear polymer segments of the connected branch copolymer. In order to achieve high solubility, it is preferred that the core segment be a linear core segment comprising an oxyalkylene homopolymer, or a random or block copolymer of an oxyalkylene. If desired, the linear core segment may also comprise a glycidyl polyether derived from methyl glycidyl ether. The particularly preferred form of core segment is a linear ethylene oxide homopolymer.

The preferred form of branched polymer segment for use in the connected branch copolymers used in the compositions and proceses of this invention is a glycidyl polyether, preferably one derived from glycidol (2,3-epoxy-1-propanol) itself. Although glycidol is relatively expensive and a relatively large amount of moles of glycidol are required per mole of core reactant to produce the preferred, highly branched connected branch copolymers, the proportion of branching polymerization monomer decreases with increase in either core segment length or linear polymer segment length, and thus the proportion of relatively expensive branching polymerization monomer used decreases with increasing molecular weight. Accordingly, because of the relatively high molecular weight of the preferred connected branch copolymers for use in the compositions and processes of the invention, such connected branch copolymers can be produced at moderate cost using relatively low proportions of the expensive glycidol.

The branch density of the connected branch copolymers has little effect upon the viscosity of their aqueous solutions and their water solubility, and thus upon their usefulness in ceramic compositions. Accordingly, in the connected branch copolymers used in the compositions and processes of the invention, it is not necessary to include any comonomer during the branching polymerization step to reduce the branch density of the branched polymer segments. If, however, reduction of the branch density is desired, such reduction is conveniently effected by including ethylene oxide monomer as a comonomer in the branching polymerization step, preferably in the amount of not more than about 4 moles of ethylene oxide per mole of glycidol.

Preferably, in the connected branch copolymers used in the compositions and processes of the invention, the linear polymer segments comprise hydroxyl-terminated ethylene oxide homopolymers. (Thus, especially preferred copolymers for use in the compositions and processes of the invention are those in which both the core and linear polymer segments comprise ethylene oxide homopolymers.) Alternatively, the linear polymer segments may be copolymers of alkylene oxide with a glycidol polyether derived from methyl glycidyl ether. Desirably, the number average molecular weight of the linear polymer segments is in the range of about 2,000 to about 10,000.

It has been found that the green strength of the greenware produced in the processes of the invention tends to be increased by using as the binder a copolymer which is solid at ambient temperatures e.g. 25°–30° C., as compared with greenware produced using a similar copolymer which is liquid at 25° C. Copolymers having sufficiently high melting points to be solid at ambient temperature are easily prepared using, for example, the ethylene homopolymer core segment/glycidol branch polymer segment/hydroxy-terminated ethylene oxide homopolymer linear polymer segment type polymer illustrated in the Examples below.

Apart from the connected branch copolymer binder, the components of the ceramic compositions of the invention are generally similar to those used in prior art compositions. Thus, the ceramic compositions of the invention comprise the connected branch copolymer binder, a ceramic material, preferably alumina, a clay and a dispersant. The dispersant is conveniently a lignosulfonate, while appropriate types of clay for use in particular ceramic compositions will be known to those skilled in the art. Typically, a ceramic composition of the invention will comprise, on a solids basis, 80 to 90 percent by weight of ceramic material, 0.1 to 10 percent by weight of the combined weights of the clay and dispersant, and 1 to 10 percent by weight of the connected branch copolymer binder. Preferably, on a solids basis, the ceramic compositions of the invention comprises 88 to 97 percent by weight of the ceramic material, 0.2 to 7 percent by weight of the combined weight of the clay dispersant and 2 to 8 percent by weight of the connected branch copolymer binder. If it is desired to increase the green strength of greenware produced from the ceramic compositions of the invention and some increase in brittleness is acceptable, polyvinyl alcohol may be added to ceramic compositions as a co-binder. When polyvinyl alcohol is added, it is preferably added in an amount of from 0.2 to 3 percent by weight of the composition.

This invention extends to the ceramic compositions of the invention in all physical forms, and in particular to such compositions in the form of spray-dried powders and aqueous slurries. Such aqueous slurries probably have a total solids content of 60 to 85 percent by weight. As already noted, it is one of the important advantages of the ceramic compositions of the invention that the reduced viscosity produced by the use of the connected branch copolymers as binders enables the ceramic compositions to have somewhat higher solids contents than prior art compositions using linear polyalkylene glycol polymer binders while still keeping the viscosity of the slurry within exceptable limits.

In the process of the invention, the slurry preferably has a viscosity at 25° C. not in excess of about 10,000 cps. Forming of the slurry into the desired shape may be achieved by spray-drying the slurry, and thereafter extruding or molding the resultant spray-dried powder in the conventional manner. The bonded mass of ceramic material may also be prepared by pouring the slurry into a mold and allowing it to remain in the mold until the solids in the slurry settle, thereby producing the bonded mass of ceramic material. The water which has separated from the slurry as a result of the settling can then be poured off and the bonded mass removed from the mold. For experimental purposes, a layer of the slurry may be spread on a substrate, and while in contact with the substrate, exposed to a temperature sufficient to reduce its water content. Following this dehydration, the substrate is removed so that the bonded mass comprises a lamina of ceramic material. Such a lamina can then be punched, cut or otherwise formed to produce appropriately shaped greenware ready for oven firing.

Finally, of course, to form the finished ceramic article using the process of the invention, the greenware produced from the slurry must be oven fired. Firing techniques or use in the process of the invention are the same as those conventionally employed for the firing of ceramic compositions and thus not be described in detail since they will be familiar to those skilled in the art. The connected branch copolymers used in the compositions and processes of the invention give good burn off similar to that produced by the prior art linear polyalkylene glycol polymer binders.

The following Examples are now given, though by way of illustration only, to show details of particularly preferred components, compositions, and techniques used in the composition and processes of the invention.

EXAMPLE 1

This Example illustrates the preparation of a connected branch copolymer having a molecular weight of approximately 20,000 and useable in the compositions of the invention. The preparation of the connected branch copolymer starts from a preformed linear polyalkylene glycol polymer which forms the core segment of the final connected branch copolymer.

1036 g. of CARBOWAX PEG 3350 (a commercially-available linear polyethylene glycol polymer produced by Union Carbide Corporation and having a molecular weight of approximately 3350) and 2.56 g. of flaked potassium hydroxide were dissolved in absolute ethanol. The ethanol and the water (produced in the formation of the core reactant) were removed under 1 mm. Hg vacuum at 110° C. for two hours to produce a core reactant. This core reactant was charged to an autoclave and held at 110° C. under a nitrogen atmosphere at a pressure of 20 psig. 139.2 g. of glycidol were slowly fed to the autoclave and the branching polymerization reaction allowed to proceed to completion to produce an intermediate polymer comprising the original linear polyethylene glycol polymer bearing branched polymer segments of glycidol residues at either end. Since 6 moles of glycidol were employed per mole of core reactant, the intermediate polymer had a total of 8 terminals of the branched polymer segments available for linear polymerization in the later step of the process. The crude intermediate polymer was removed from the autoclave, neutralized with 2.5 ml of 85 percent phosphoric acid and vacuum stripped then stored under nitrogen before use in the next step of the procedure.

To 1420 g of the intermediate polymer produced as described above were added 12.89 g of potassium hydroxide in absolute ethanol. After removal of water and ethanol under the conditions described above, 1278 g. of the intermediate copolymer alkoxide were charged to an autoclave and held at 110° C. under a nitrogen atmosphere at a pressure of 20 psig. 4231.18 g of ethylene oxide were charged to the reactor and allowed to react completely. 40 g. of the resultant product were removed for a melt viscosity check. A further 557.9 g. of ethylene oxide were fed to the reactor and allowed to react completely, then a further 40 g. sample of the resultant product was removed for a viscosity check. Thereafter, 1043 g. of material were removed from the reactor, neutralized with 1.5 ml of 85 percent phosphoric acid and vacuum stripped at 90° C. under 5 mm. Hg. pressure.

A further 199 g. of ethylene oxide were charged to the reactor and allowed to react completely under the same conditions as before. A 40 g. sample of the resultant product was removed from the reactor for a viscosity check, then 3428 g. of product were removed from the reactor and neutralized with 1.5 ml. of 85 percent phosphoric acid and vacuum stripped under the same conditions as before.

Finally, a further 151.4 g. of ethylene oxide were fed to the reactor and allowed to react completely under the same conditions as before. A 40 g. sample was removed for a viscosity check and, when the viscosity check indicated that the desired molecular weight had been achieved, the remaining material was removed from the reactor, neutralized with 2.0 ml. of 85 percent phosphoric acid and vacuum stripped at 90° C. under 5 mm. Hg. pressure. This purified connected branch copolymer is referred to as connected branch copolymer 1 in the tests described below and had an average molecular weight of approximate 30,700, with 8 linear polymer segments each comprising and ethylene oxide homopolymer with a number average molecular weight of approximately 3250.

EXAMPLE 2

This Example illustrates the preparation of a second connected branch copolymer useable in the compositions and processes of the invention, this copolymer being prepared starting from a pre-formed linear polyethylene glycol polymer.

A core reactant was prepared by adding 19.8 g. of flaked potassium hydroxide dissolved in absolute ethanol to 919 g. of CARBOWAX PEG 3350 and removing the ethanol solvent and the water produced by the condensation reaction under vacuum at 110° C. for two hours. 887 g. of this core reactant were charged into an autoclave and maintained at 110° C. under a nitrogen atmosphere at 20 psig. 248 ml. of glycidol were slowly fed to the autoclave with stirring, and the coupling reaction allowed to proceed to completion, thereby producing an intermediate polymer comprising a linear polyethylene glycol core segment capped by two glycidyl polyether branched polymer segments. Since 12 moles of glycidol were employed per mole of core reactant, the intermediate polymer had a total of 14 terminals of the branched polymer segments available for linear polymerization in the later step of the process. Next, 5686 g. of ethylene oxide were fed to the autoclave and the polymerization reaction allowed to proceed to completion. 52 g. of the resultant polymer were removed from the autoclave for a viscosity test; its viscosity was found to be 4083 Saybolt universal seconds (sus.) at 65° C. Thereafter, an additional 999 g. of polymer were removed from the autoclave. Next, a further 885 g. of ethylene oxide were fed to the autoclave and the polymerization allowed to proceed to completion in the same manner as before. 1649 g. of polymer were removed from the autoclave, neutralized with 3.0 ml. of 85 percent phosphoric acid and vacuum stripped. The viscosity of this purified polymer was found to be 4128 sus. at 65° C. Thereafter, an additional 2500 g. of polymer were removed from the autoclave, then 2500 g. of ethylene oxide were fed to the autoclave and the polymerization reaction allowed to proceed to completion in the same manner as before. A 47 g. sample was removed for a viscosity check and the viscosity found to be 8040 sus. at 65° C. Then a further 500 g. of ethylene oxide were fed to the reactor, the polymerization reaction allowed to proceed to completion in the same manner as before and a sample removed from the reactor and its viscosity checked. The viscosity of this polymer was found to be 9879 sus. at 65° C. Finally, 4368 g. of the polymer were removed from the reactor, neutralized with 6.3 ml. of 85 percent phosphoric acid and vacuum stripped at 90° C. and 5 mm. Hg. pressure to give a connected branch copolymer having an average molecular weight of 56,500, with 14 linear polymer segments each comprising an ethylene oxide homopolymer with a number average molecular weight of approximately 3600. This connected branch copolymer is designated connected branch copolymer 2 in the tests described below.

EXAMPLE 3

This Example illustrates the lower viscosities obtainable with CBS polymers as compared with prior art polymers having similar molecular weights and based upon the same monomers.

The experimental polymers used in the tests were as follows:

1 and 2: the connected branch copolymers produced in Examples 1 and 2 above.

A: a glycerol-initiated polyethylene glycol having an average molecular weight of approximately 16,000.

B: a glycerol-initiated polyethylene glycol having an average molecular weight of approximately 20,000.

C: a low viscosity polyethylene glycol having a molecular weight of approximately 10,000 and made by coupling the linear polyethylene glycol CARBOWAX PEG 3350 described in Example 1 above with EPON 828 (the bis diglycidyl ether of bisphenol A).

D: a medium viscosity polyethylene glycol having a molecular weight of approximately 10,000 and produced in the same manner as experimental polymer C.

E: a high viscosity polyethylene glycol having a molecular weight of approximately 10,000 prepared in the same manner as experimental polymer C above.

F: CARBOWAX PEG 8000, a linear polyethylene glycol produced commercially by Union Carbide Corporation and having a molecular weight of approximately 8,000.

G: CARBOWAX PEG 14000, a linear polyethylene glycol produced commercially by Union Carbide Corporation and having a molecular weight of approximately 14,000.

H: Polyethylene Glycol Compound 20000, a polyethylene glycol produced commercially by Union Carbide Corporation. This material is essentially a linear polyethylene glycol polymer made by coupling CARBOWAX 8000 with the diglycidyl ether of bisphenol A, and has hitherto been the polyethylene glycol polymer of choice for use in commercial ceramic compositions. The molecular weight of the coupled polymer is approximately 20,000.

33 percent solutions of each of the experimental polymers were prepared by the following procedure. Two liters of distilled water were heated to 75° C. and stirred at moderate speed while 985 g. of the polymer were added. After addition of the polymer had been completed, mixing was continued at a higher speed for approximately 35 minutes, or until the polymer had completely dissolved, the temperature of the solution being maintained at 75° C. throughout the mixing period. The polymer solution was then allowed to cool and tested by touch. If the polymer solution felt "grainy", indicating that the polymer was not completely dissolved, the high speed mixing for 35 minutes at 75° C. and the cooling to room temperature were repeated until the grainy feeling had disappeared.

During this procedure, the degree of foaming occurring when the polymers went into solution was observed and is shown in Table 1 below. It should be noted that foaming only presents a problem when immediate use of the polymer solution is required; otherwise, the polymer solution can be left to stand for some time, whereupon the foaming will disappear.

The viscosities of the 33 percent aqueous polymer solutions as thus prepared were measured using a Brooksfield rotational viscometer with a #1 spindle. The viscosities obtained, together with the degree of foaming, are given in Table 1 below.

TABLE 1

| Polymer | Viscosity (centipoise) | Foaming |
|---------|------------------------|-------------|
| 1 | 153 | Little |
| 2 | 73 | None |
| A | 146 | None |
| B | 128 | Very Little |
| C | 220 | Sufficient |
| D | 243 | Moderate |
| E | 316 | Sufficient |
| F | 103 | None |
| G | 227 | Very Little |
| H | 374 | Moderate |

From the data in Table 1, it will be seen that the connected branch copolymers 1 and 2 gave aqueous solutions with much lower viscosities than similar solutions containing linear polymers of lower molecular weights. Moreover, the viscosity figures for the connected branch copolymers 1 and 2 illustrate the capability of connected branch copolymers for the production of high molecular weights without increase in viscosity; although connected branch copolymer 2 has a molecular weight almost twice that of polymer 1, its viscosity in aqueous solution is less than half that of the lower molecular weight polymer.

EXAMPLE 4

This Example illustrates that ceramic compositions of the invention can be formulated using connected branch copolymers of relatively high molecular weight without excessive slurry viscosity. This example also illustrates the good green strengths obtained in greenware produced by the process of the invention.

For the slurry viscosity tests, a series of ceramic composition slurries were prepared each having a composition of 73 percent by weight alumina (10 percent A-14 alumina, 90 percent A-16 alumina), 1.9 percent by weight of the polymer, 0.4 percent by weight of tetrasodium pyrophosphate (TSPP) as a deflocculant and 24.7 percent distilled water. These slurries were prepared by the following procedure. 241.25 ml. of distilled water were placed in a container equipped with a stirrer and 9 ml. of TSPP were added (all addition of TSPP were in the form of an aqueous solution containing 0.16 g/ml.). The resultant mixture was stirred at high speed while 625 g. of A-16 alumina were gradually added, followed by 7 ml. of TSPP. The high speed mixing was then continued for ten minutes. With continued mixing, a further 250 g. of A-16 alumina were gradually added, followed by 10 ml. of TSPP and mixing was then continued for further twenty minutes. Next, 96 g. of A-14 alumina were gradually added, followed by a further 10 ml. of TSPP and mixing was continued for a further fifteen minutes. Finally, 75.5 ml. of the 33 percent aqueous solution of the appropriate polymer were gradually added and the mixing continued for a further 10-15 minutes to give the final slurry. The viscosity of the slurry was measured at room temperature using a Brooksfield rotational viscometer with a #1 spindle and the results are shown in Table 2 below.

To determine the green strength of the greenware produced using the experimental polymers as binders, a second series of slurries were prepared as follows (the figures in parentheses represent the proportion of each solid component as a percentage of the total solids content). Each of the second series of slurries contained 70 (95.76) percent of alumina (using the same 10 percent A-14, 90 percent A-16 mixture as before), 1.8 (2.46) percent by weight of the polymer, 0.9 (1.23) percent of polyvinyl alcohol (added as the commercially-available product Vinol 205, an aqueous solution containing 22% by weight of polyvinyl alcohol), 0.4 (0.55) percent by weight of TSPP and 26.9 percent by weight of water. The procedure used for formulating the second series of slurries was as follows. 482.5 ml. of distilled water was placed in a container equipped with a high speed mixer and 18 ml. of TSPP were added. High speed mixing was commenced and 1250 g. of A-16 alumina were gradually added, followed by a further 14 ml. of TSPP. The high speed mixing was then continued without further additions of material for ten minutes. Under continued high speed mixing, a further 500 g. of A-16 alumina were gradually added, followed by a further 20 ml. of TSPP, then the high speed mixing was continued without further additions of material for twenty minutes. Next, again under continued high speed mixing, 80 g. of A-14 alumina were added, followed by a further addition of 10 ml. of TSPP and high speed mixing was continued without further additions of material for ten minutes. Mixing was continued, and a further 112.5 g. of A-14 alumina were gradually added, followed by a further 10 ml. of TSPP and mixing was continued for a further fifteen minutes without further additions of material. 114 g. of the Vinol 205 were added under continued high speed mixing; at this point, it was sometimes necessary to increase the mixing speeds because the addition of the PVA tended to cause the mixture to become more viscous. High speed mixing was continued for a further ten minutes without further addition of material. Finally, 151 g. of the 33 percent solids aqueous solution (prepared in Example 3 above) of the appropriate experimental polymer was added to the mixture under continued high speed mixing, and after approximately twenty minutes further high speed mixing without further additions of material the slurry (slip) was ready for use. As a check, a 25 ml. sample of the slurry was used to perform a percent solids evaluation. The above procedure should yield a 73.4 percent solids slurry.

The second series of slurries thus prepared were then spray-dried to produce powders. With polymers 1, 2, A-D and G, minor dilution of the slurry was effected in order to reduce its viscosity since the slurries were sufficiently viscous to make the necessary atomization before spray-drying difficult. Weight percent solids and specific gravities for the slurries immediately prior to atomization are given in Table 2 below. Atomization of the slurries was effected using a 59N-06B atomizer with a two-fluid nozzle at an atomizing pressure of 40 psig. Atomization was effected into the chamber of a direct gas heated hot air dryer. The inlet temperature of the dryer was 280°-282° C. in the case of the polymer A slurry and 280° C. for all the remaining slurries, while the outlet temperature was 130°-131° C. for the polymer A and polymer B slurries and 130° C. for all the remaining slurries. No cold air was utilized in the spray-drying process. The polymer A and B slurries produced light, hard accumulations in the drying chamber, while the remaining slurries produced moderate and hard accumulations. Further details of the spray-drying process are given in Table 2 below.

TABLE 2

| Polymer | 1 | 2 | A | B | C | D | E | F | G | H |
|---|---|---|---|---|---|---|---|---|---|---|
| Wt. % Solids | 69.0 | 68.5 | 69.0 | 69.0 | 68.5 | 71.0 | 70.5 | 69.5 | 68.5 | 69.8 |
| Spec. Gravity | 1.84 | 1.79 | 1.95 | 1.82 | 1.88 | 1.83 | 1.95 | 1.97 | 1.89 | 1.93 |
| Feed Rate, mls/min | 183 | 235 | 250 | 183 | 196 | 247 | 248 | 203 | 300 | 224 |
| Total Feed, mls | 1200 | 1200 | 1000 | 1200 | 1040 | 1060 | 1280 | 1260 | 900 | 1300 |
| Fines-Cyclone Collector, gms | 316 | 257 | 166 | 299 | 204 | 144 | 308 | 359 | 160 | 179 |
| Coarse-Chamber Collector, gms | 961 | 904 | 617 | 1003 | 854 | 616 | 1092 | 1127 | 695 | 1025 |
| Total Collected, gms | 1277 | 1161 | 783 | 1302 | 1057 | 790 | 1400 | 1486 | 855 | 1204 |
| Total Solids Fed, gms | 1523 | 1471 | 1345 | 1506 | 1339 | 1377 | 1759 | 1725 | 1165 | 1751 |
| % Recovery, Wet Basis | 83.8 | 78.9 | 58.2 | 86.4 | 79.0 | 55.1 | 79.5 | 86.1 | 73.3 | 68.7 |

After collecting the spray-dried powders, four parts by weight of the coarse spray-dried powder was mixed with one part by weight of the fines and the powders were pressed at 20,000 psi (138 MPa.) to form long bars (having a length to thickness ratio of at least 10:1) of either rectangular or circular cross section. These bars were then tested for their green strength modulus of rupture. This modulus, which is the fracture strength of a material under a bending load, is the property of major importance in greenware. The moduli were determined using three-point loading ensuring that the specimen was correctly aligned in the specimen holder so that the specimen could not twist while being loaded. For each slurry, five bars were tested and the average modulus of rupture and standard deviation were calculated. These values are shown in Table 3 below, together with the slurry viscosity measurements discussed above.

TABLE 3

| Polymer | Slurry Viscosity | Dilution | Green Strength M.O.R. |
|---|---|---|---|
| 1 | 5933 | X | 303 + 20 psi |
| 2 | 15600 | X | 198 + 8 psi |
| A | 6840 | X | 235 + 9 psi |
| B | 7270 | X | 211 + 17 psi |
| C | 6760 | X | 253 + 22 psi |
| D | 7473 | X | 241 + 12 psi |
| E | 6813 |  | 149 + 12 psi |
| F | 6600 |  | 132 + 14 psi |
| G | 11200 | X | 173 + 15 psi |

TABLE 3-continued

| Polymer | Slurry Viscosity | Dilution | Green Strength M.O.R. |
|---|---|---|---|
| H | 8021 | | 236 + 12 psi |

From the data in Tables 1 and 3, it will be seen that there is little or no correlation between thed viscosity of a polymeric binder in simple aqueous solutions and in ceramic composition slurries; in particular, the connected branch copolymer 2 had the lowest viscosity in simple aqueous solution but the highest slurry viscosity. The data in Table 3 illustrate that the connected branch copolymers can have relatively high molecular weights and still give slurries of acceptable viscosity. For example, connected branch copolymer 1 having a molecular weight of approximately 30,000 gave a lower slurry viscosity than polymers A, B, C, D, F, G and H although it had a molecular weight substantially higher than all of them. Moreover, the connected branch copolymers gave high green strengths as determined by the modulus of rupture. The behavior of connected branch copolymer 1 was outstanding, giving the lowest slurry viscosity and highest green strength of any of the polymers tested.

It will be apparent to those skilled in the art that numerous changes and modifications can be made in the preferred embodiments of the invention discussed above without departing from the scope of the invention. Accordingly, the whole of the foregoing description is to be construed in an illustrative and not in a limitative sense, the scope of the invention being defined solely by the appended claims.

We claim:

1. A ceramic composition comprising a ceramic material, clay, a dispersant and a polymeric binder, the binder comprising a connected branch copolymer comprising:
   (A) a core segment having a valence of v, wherein v is an integer, and having correspondingly v terminal bonds each connected to one of a group of:
   (B) v polyvalent, non-crosslinked branched polymer segments each having an average of t terminal bonds, wherein t is greater than about two, one of said terminal bonds being connected to said core segments, and each of said branched polymer segments being connected via its remaining (t−1) terminal bonds to:
   (C) a set of linear polymer segments, with an average of t−1 linear polymer segments per set, to provide a group of about v(t−1) linear polymer segments wherein the linear polymer segments have substantially similar chain lengths and composition within said group, the connected branch copolymer having a group of terminal linear polymer segments bearing terminal groups capable of effecting hydrogen bonding.

2. A ceramic composition to claim 1 comprising, on a solids basis, from about 80 to about 98 percent by weight of the ceramic material, from about 0.1 to about 10 percent by weight of the combined weights of the clay and dispersant, and from about 1 to about 10 percent by weight of the polymeric binder.

3. A ceramic composition according to claim 2 comprising, on a solids basis, from about 88 to about 97 percent by weight of the ceramic material, from about 0.2 to about 7 percent by weight of the combined weights of the clay and dispersant and from about 2 to about 8 percent by weight of the polymeric binder.

4. A ceramic composition according to claim 1 wherein the ceramic material comprises alumina.

5. A ceramic composition according to claim 1 wherein the dispersant comprises a lignosulfate.

6. A ceramic composition according to claim 1 wherein the number average molecular weight of the polymeric binder is at least about 20000.

7. A ceramic composition according to claim 1 wherein, in the polymeric binder, the core, branched and linear segments provide separate hydrophobic and hydrophilic portions of the polymer.

8. A ceramic composition according to claim 1 wherein the connected branch copolymer is an organic polymer comprising only the elements carbon, hydrogen, oxygen, nitrogen and silicon.

9. A ceramic composition according to claim 1 wherein, in the polymeric binder, the core segment has a linear or star structure.

10. A ceramic composition according to claim 9 wherein the connected branch copolymer comprises only the elements carbon, hydrogen, oxygen and nitrogen.

11. A ceramic composition according to claim 9 wherein the polymeric binder has a divalent linear core segment connecting two polyvalent, non-crosslinked, branched polymer segments, which are in turn connected to two sets of linear polymer segments.

12. A ceramic composition according to claim 11 wherein, in the polymeric binder, the linear core segment comprises a polysiloxane, polyoxyalkylene, polyalkylene, polyester, polyamide, polyurethane, or an alkyl ether.

13. A ceramic composition according to claim 12 wherein, in the polymeric binder, the linear core segment comprises an oxyalkylene homopolymer, or a random or block copolymer of an oxyalkylene.

14. A ceramic composition according to claim 13 wherein, in the polymeric binder, the linear core segment further comprises a glycidyl polyether derived from methyl glycidyl ether.

15. A ceramic composition according to claim 13 wherein, in the polymeric binder, the core segment is an ethylene oxide homopolymer.

16. A ceramic composition according to claim 13 wherein, in the polymeric binder, the number average molecular weight of the core segment is in the range of about 200 to about 10000.

17. A ceramic composition according to claim 9 wherein, in the polymeric binder, the star core segment comprises a polyether derived from reacting an alkylene oxide with glycerol, pentaerythritol, dipentaerythritol or trimethylolpropane.

18. A ceramic composition according to claim 1 wherein, in the polymeric binder, the branched polymer segments comprise polyethers or polyamines.

19. A ceramic composition according to claim 18 wherein, in the polymeric binder, at least one branched polymer segment comprises a glycidyl polyether.

20. A ceramic composition according to claim 19 wherein the glycidyl polyether is derived from glycidol.

21. A ceramic composition according to claim 1 wherein, in the polymeric binder, at least one branched polymer segment comprises a polyimine derived from aziridine.

22. A ceramic composition according to claim 1 wherein, in the polymeric binder, at least one of the branched polymer segments has a reduced branching density due to the presence of linear polymer segments within the branched polymer segment.

23. A ceramic composition according to claim 1 wherein the connected branch copolymer has only one group of branched polymer segments and one group of linear polymer segments, the group of v branched polymer segments thus connecting the core segment to the group of hydroxyl-terminated polyoxyalkylene linear polymer segments.

24. A ceramic composition according to claim 1 wherein the terminal groups capable of effecting hydrogen bonding comprise carboxylic acid groups, esters, salts or amides of carboxylic acid groups, amino groups, phosphate groups, esters, salts and amides of phosphate groups or hydroxyl groups.

25. A ceramic composition according to claim 24 wherein the terminal groups capable of effecting hydrogen bonding are hydroxyl groups.

26. A ceramic composition according to claim 25 wherein the terminal linear polymer segments comprise hydroxyl-terminated polyoxyalkylene linear polymer segments.

27. A ceramic composition according to claim 26 wherein the polymeric binding comprises from about 8 to about 26 of said hydroxyl-terminated polyoxyalkylene linear polymer segments.

28. A ceramic composition according to claim 1 wherein, in the polymeric binder, the linear polymer segments comprise hydroxyl-terminated ethylene oxide homopolymers.

29. A ceramic composition according to claim 28 wherein, in the polymeric binder, the core segment is an ethylene oxide homopolymer.

30. A ceramic composition according to claim 1 wherein, in the polymeric binder, the linear polymer segments further comprise a glycidyl polyether derived from methyl glycidyl ether.

31. A ceramic composition according to claim 1 wherein the polymeric binder is of the formula:

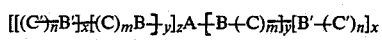

wherein A is a core segment having a valence of z+1; B and B' are non-crosslinked, branched polymer segments having valences of m+1 and n+1, respectively; C and C' are linear polymer segments having substantially similar chain lengths and composition within each group of x or y segments; m is greater than 1 and may vary between each set of linear polymer segments; n is (1) greater than 1 or (2) may be 0 when y is greater than 0; x is (1) 1 when y is 0 or (2) m when y is 1 and the product of all m values when y is greater than 1; y and z are each integers greater than or equal to 0; provided that y is at least 1 when z is 0.

32. A ceramic composition according to claim 31 wherein the polymeric binder has a structure such that y is 0 and z is 1 and is thus of the formula:

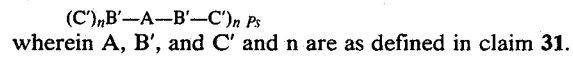

wherein A, B', and C' and n are as defined in claim 31.

33. A ceramic composition according to claim 1 wherein, in the polymeric binder, the number average molecular weight of the linear polymer segments is in the range of about 2000 to about 10000.

34. A ceramic composition according to claim 1 wherein the polymeric binder is one which, in its pure form, is solid at 25° C.

35. A ceramic composition according to claim 1 further comprising from about 0.2 to about 3 percent by weight of of polyvinyl alcohol.

36. A ceramic composition according to claim 1 in the form of a spray-dried powder.

37. A ceramic composition according to claim 1 in the form of an aqueous slurry having a total solids content of from about 60 to about 85 percent by weight.

38. A ceramic composition according to claim 32 wherein the weight of water in the slurry is not more than about twice the weight of the connected branch copolymer therein.

39. A bonded mass of ceramic material produced by the steps comprising:
forming an aqueous slurry comprising water, a ceramic material, clay, a dispersant and a polymeric binder, the binder comprising a connected branch copolymer comprising:
(A) a core segment having a valence of v, wherein v is an integer, and having correspondingly v terminal bonds each connected to one of a group of:
(B) v polyvalent, non-crosslinked branch polymer segments each having an average of t terminal bonds, wherein t is greater than about two, one of said terminal bonds being connected to said core segment, and each of said branched polymer segments being connected via its remaining (t−1) terminal bonds to:
(C) a set of linear polymer segments, with an average of t−1 linear polymer segments per set, to provide a group of about v(t−1) linear polymer segments wherein the linear polymer segments have substantially similar chain lengths and composition within said group, the connected branch copolymer having a group of terminal linear polymer segments bearing terminal groups capable of effecting hydrogen bonding; and
reducing the water content of the slurry until the slurry forms the bonded mass of ceramic material.

* * * * *